United States Patent
Ramsey et al.

(10) Patent No.: US 9,205,517 B1
(45) Date of Patent: Dec. 8, 2015

(54) ADVANCED TACTICAL LINE REPLACEABLE UNIT ALIGNMENT SYSTEM

(71) Applicant: BAE SYSTEMS Information And Electronic Systems Integration Inc., Nashua, NH (US)

(72) Inventors: Eric R. Ramsey, Derry, NH (US); Bradley J. Bell, Manchester, NH (US); Tyler D. Forbes, Mont Vernon, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 189 days.

(21) Appl. No.: 13/940,002

(22) Filed: Jul. 11, 2013

Related U.S. Application Data

(60) Provisional application No. 61/670,323, filed on Jul. 11, 2012.

(51) Int. Cl.

| | |
|---|---|
| *B23P 19/04* | (2006.01) |
| *G01C 25/00* | (2006.01) |
| *G01C 17/38* | (2006.01) |
| *G01C 21/16* | (2006.01) |
| *G01C 1/00* | (2006.01) |
| *G01C 21/20* | (2006.01) |
| *G01C 21/06* | (2006.01) |

(52) U.S. Cl.
CPC ............ *B23P 19/04* (2013.01); *G01C 17/38* (2013.01); *G01C 21/16* (2013.01); *G01C 25/005* (2013.01); *G01C 1/00* (2013.01); *G01C 21/06* (2013.01); *G01C 21/20* (2013.01); *Y10T 29/4973* (2015.01); *Y10T 29/49718* (2015.01); *Y10T 29/49721* (2015.01); *Y10T 29/49771* (2015.01); *Y10T 29/49826* (2015.01)

(58) Field of Classification Search
CPC ...... B23P 19/04; G01C 17/38; G01C 25/005; G01C 19/00; G01C 19/38; G01C 21/36; G01C 21/20; G01C 21/16; G01C 21/06; G01C 1/00; Y10T 29/49771; Y10T 29/49826; Y10T 29/49721; Y10T 29/4973; Y10T 29/49718

See application file for complete search history.

(56) References Cited

U.S. PATENT DOCUMENTS

| | | | | |
|---|---|---|---|---|
| 4,212,443 | A * | 7/1980 | Duncan et al. | 244/177 |
| 8,005,635 | B2 * | 8/2011 | Lin | 702/92 |
| 8,590,377 | B2 * | 11/2013 | Post et al. | 73/504.04 |
| 2002/0035448 | A1 * | 3/2002 | Denny et al. | 702/188 |

* cited by examiner

*Primary Examiner* — John C Hong
(74) *Attorney, Agent, or Firm* — Sand & Sebolt; Daniel J. Long

(57) ABSTRACT

A system and method for mounting a device to a piece of equipment is presented, and may include a handheld inertial measurement unit (IMU), a computer logic and a mounting interface. The piece of equipment may have a line replaceable unit (LRU) mount that allows a new LRU to be mounted thereon. The mounting interface may be mounted to a LRU mount. The handheld IMU may determine position data with respect to the LRU mount and the piece of equipment. The computer logic may be configured to calculate a positional error value based on the position data to indicate to a user whether corrections need to be made regarding how the new LRU is mounted to the LRU mount before the new LRU is mounted to the LRU mount or whether the new LRU can be mounted to the LRU mount without any corrections.

15 Claims, 7 Drawing Sheets

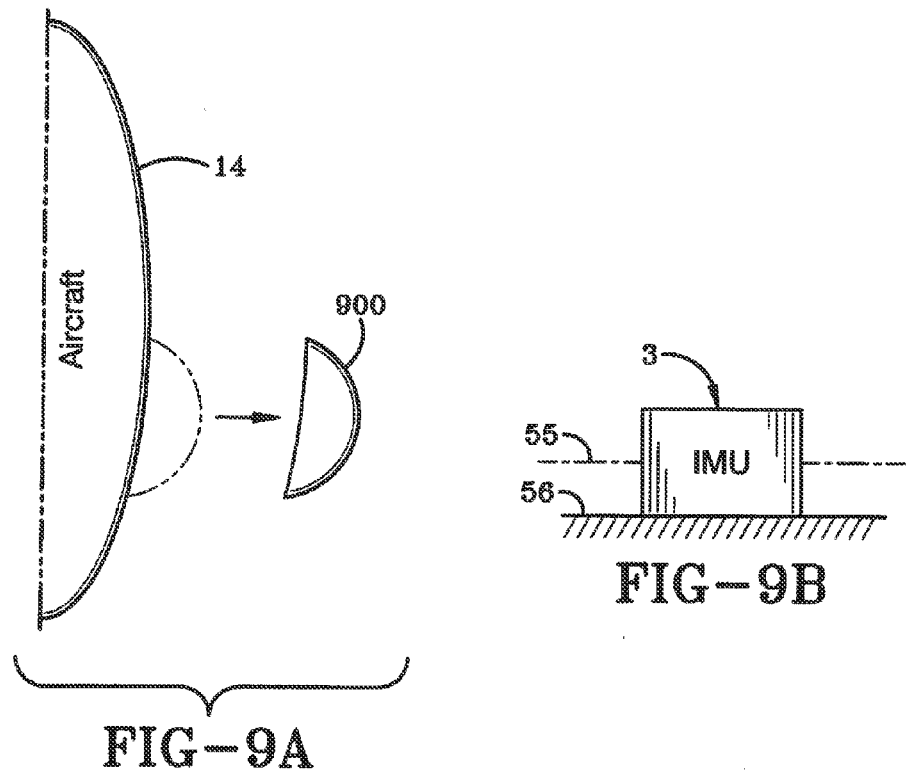
FIG-9B
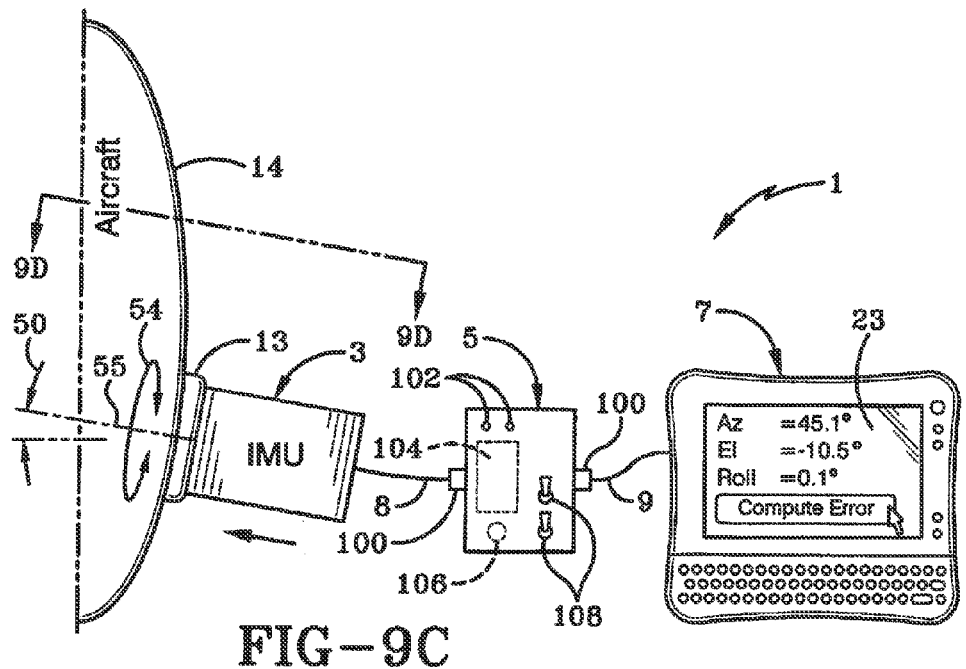
FIG-9A
FIG-9C

ADVANCED TACTICAL LINE REPLACEABLE UNIT ALIGNMENT SYSTEM

CROSS REFERENCE TO RELATED APPLICATION

This application claims priority from U.S. Provisional Application Ser. No. 61/670,323, filed Jul. 11, 2012; the disclosure of which is incorporated herein by reference.

BACKGROUND OF THE INVENTION

1. Field of Invention

The current invention relates generally to apparatus, systems and methods for mounting devices to equipment. More particularly, the apparatus, systems and methods relate to mounting devices to equipment at a precise orientation. Specifically, the apparatus, systems and methods provide for generating positioning information automatically to aid a user in mounting a device to a piece of equipment.

2. Description of Related Art

During the system integration process, precision alignment of Line Replaceable Units (LRUs) to each other and the host platform is often required. The current methods of precision alignment rely on tools that were not designed for measuring Euler angles, and or Euler angles with respect to a single predetermined reference frame. This has led to non-standardized techniques and procedures, resulting in differing interpretations of results and variations in measurement accuracy. Furthermore, current methods require a knowledgeable user with an understanding of complex mathematics and depend on the user to keep detailed notes of how the particular tool used was oriented at each measurement point. New problems surface from the recent concept of operations updates which require precise/consistent alignment measurements to be made in-theatre. Given the complexity, variation in accuracy, measurement standardization difficulties, and time required to calculate final results, a new tool was required. What is needed is a better way of replacing LRUs and other devices that need to be mounted on equipment at a precise orientation.

SUMMARY

In one aspect, the invention may provide a system for mounting a new line replaceable unit (LRU) to a piece of equipment, the system comprising a handheld inertial measurement unit (IMU) that can be manipulated by a single person wherein the piece of equipment has an old LRU mount configured to allow a new LRU to be mounted to the piece of equipment at the LRU mount; a computer logic configured to be commutatively connected to the handheld IMU; a mounting interface configured to be mounted to an LRU mount attached to the piece of equipment, wherein the mounting interface provides for the handheld IMU to be positioned adjacent the mounting interface to allow the handheld IMU to determine position data with respect to the LRU mount and the piece of equipment; wherein the computer logic is configured to calculate, based on the position data, a positional error value that can be used to indicate to a user (a) whether corrections need to be made regarding how the new LRU is mounted to the LRU mount before the new LRU is mounted to the LRU mount or (b) whether the new LRU can be mounted to the LRU mount without any corrections.

In another aspect, the invention may provide a method comprising the steps of removing an old device from a device mount on a piece of equipment; attaching a device mounting interface to the device mount; placing a handheld IMU adjacent the device mounting interface; measuring position data corresponding to a position of the handheld IMU at the device mounting interface; transmitting the position data from the handheld IMU to a computer logic; determining with the computer logic a position error value based on the position data, wherein the position error value indicates if a new device can be installed without correcting for a position of the device mount; compensating for the position error value if the new device cannot be installed without correcting for a position of the device mount; removing the device mounting interface from the device mount; and installing the new device to the device mount to mount the new device on the piece of equipment.

BRIEF DESCRIPTION OF SEVERAL VIEWS OF THE DRAWINGS

One or more embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIGS. 9A-E further illustrate the method of FIG. 8.

Similar numbers refer to similar parts throughout the drawings.

DETAILED DESCRIPTION

The invention typically comprises an Advanced Tactical LRU Alignment System (ATLAS) that uses an inertial measurement unit (IMU) technology. It was designed around an end user who requires minimal knowledge of the alignment process and features an easy-to-follow graphical user interface (GUI), embedded mathematics, built-in standardization of measurement procedures, and automatic generation of alignment/alignment verification results. It allows for precision measurements to be performed quickly and easily. The system has been designed to facilitate LRU alignment measurements for threat warning and countermeasure systems as well as general alignment measurements for any other equipment.

Figure 1A:
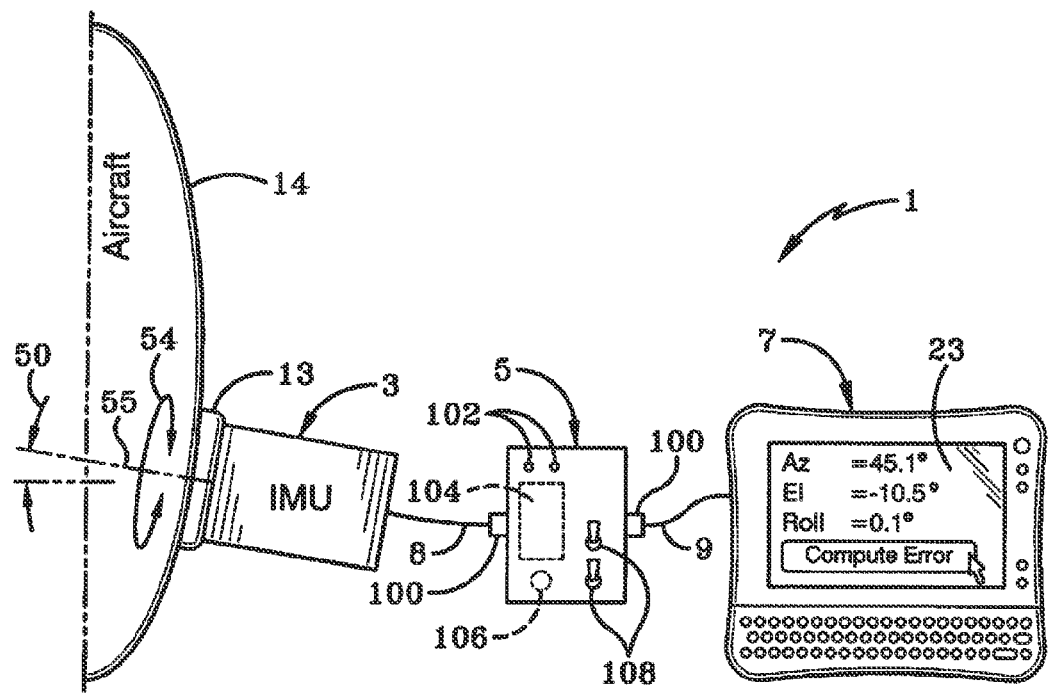
FIG. 1A is a schematic diagram of a sample embodiment of a system for positioning a device on a piece of equipment.

FIG. 1A illustrates the sample embodiment of a system 1 used for the accurate alignment of LRUs. The system includes a handheld IMU 3, an interface box 5 and a laptop computer 7. When in use, these components are connected together with cables 8, 9. In some configurations, interface box 5 may not be needed and handheld IMU 3 can be directly connected to laptop computer 7. In general, handheld IMU 3 will be used together with an LRU mounting interface 13 that allows for handheld IMU 3 to be properly aligned with a LRU mounting device corresponding to the LRU to be installed or replaced. A specific LRU mounting interface for use with a threat warning LRU discussed later is alternatively referred to as a "face fixture". Additionally, FIG. 1A illustrates system 1 being used on an LRU associated with a piece of equipment with may be in the form of an aircraft 14. Those of ordinary skill in the art will appreciate that system 1 can be used where any device is to be mounted to virtually any piece of equipment. For example, system 1 can be used when mounting something to a vehicle such as a car, truck or train, to a fixed structure, to a piece of machinery or to another piece of equipment or device.

Interface box 5 has internal control logic that provides power management and control of inputs/outputs 21 of handheld IMU 3. Interface box 5 can have, for example, input power of either 28 VDC or 120/240 VAC 60/50 Hz. Additionally, interface box 5 can include two or more connectors 100, a set of battery indicator LEDs 102, a 12V battery and charger 104, a circuit breaker 106, and two (or more) power selection switches 108. For monitoring and control of LED indicators 17 and a capture button 19 on handheld IMU 3, interface box 5 houses a laptop-controlled microcontroller with logic. Commands can be sent from laptop computer 7 to interface box 5 through an RS-232 communication interface. Interface box 5 converts the signals to RS-422 for transmittal to handheld IMU 3. The reverse order can be applied when transmitting inertial data from handheld IMU 3 to the laptop through the interface box.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Figure 1B:
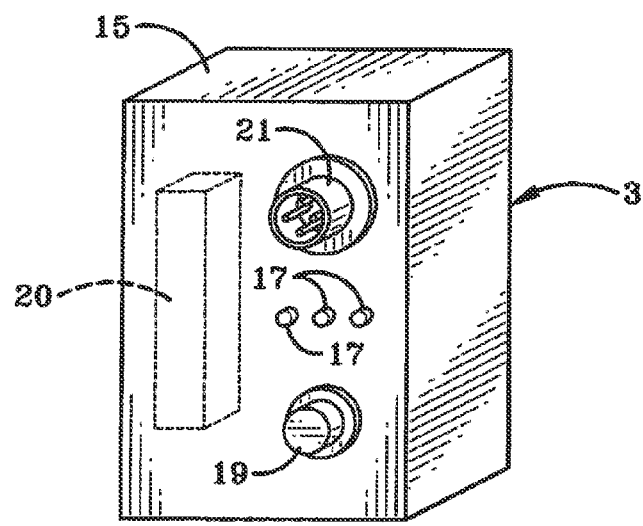
FIG. 1B is a diagrammatic perspective view of a sample embodiment a handheld IMU.

FIG. 1B illustrates some details of handheld IMU 3, which can be manipulated by a single person. Handheld IMU 3 includes a housing assembly 15, one or more LED indicator lights 17, a capture button 19, an internal IMU 20 and a connector 21. The connector 21 can be a MIL-DTL-38999 style connector. Handheld IMU 3 measures the rotational rates applied to system 1. The rotational rates are transmitted back to the laptop 7 for processing and alignment estimation.

The laptop 7 can be any laptop, tablet computer, other computer logic or other computing device. Computer 7 may be a ruggedized tablet running a software application that monitors status, controls status indicators, runs the complex quaternion algorithms, and provides the simple user interface. Data from handheld IMU 3 is passed through interface box 5 and fed directly to the laptop 7. The computer logic may be configured to be commutatively connected to handheld IMU 3, such as through interface box 5. The laptop monitors the IMU's operational status and processes all sensor data received when a measurement or calibration is initiated. Results of the IMU data processing are displayed within the ATLAS software's user interface 23 (FIG. 1A) to provide the user with real-time updates of alignment information and IMU data validity.

Figure 9D:
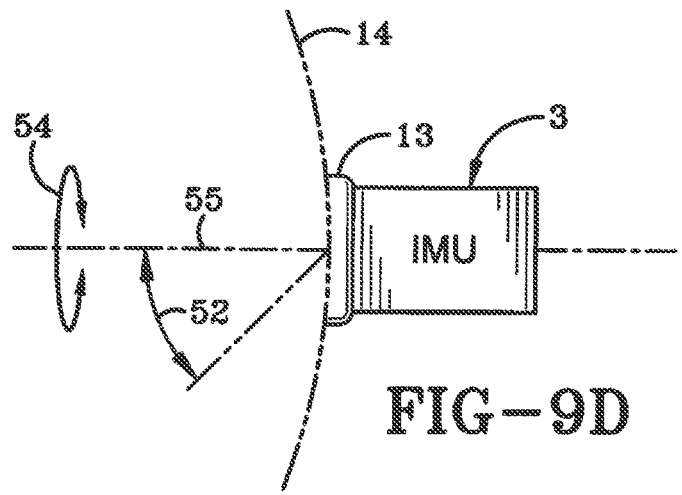

System 1 can make measurement with various levels of accuracy dependent on allowed rotation, motion and the duration of the measurement. For example, in one case it could measure with an accuracy of 0.1 degrees total angle, three sigma deviation over 3 minutes with some motion. Alternatively, in another case it could measure with an accuracy of 0.3 degrees total angle, three sigma deviation over 9 minutes with some motion or have other measurement accuracies. System 1 can have various power sources. Typically, system 1 is battery powered with batteries that can be recharged. Alternatively, it can be powered by an external power supply. System 1 can make a variety of measurements. In the sample embodiment, system 1 can measure azimuth 52, elevation 50, and roll angles 54 about a roll axis 55 (FIGS. 1A, 9C, 9D). Alternatively, it can measure rectangular coordinate angles or other angles or measurements.

The system can have other useful features and/or functionality. In one embodiment, IMU housing 15 can be small and lightweight for use with one hand. System 1 can have a simple user interface 23 to minimize training needed. In some configurations, the system's software can compute alignment errors to facilitate comparison of as-measured errors to specified tolerances. In other embodiments, the system's software can generate a report with nominal mounting, measured mounting parameters and errors.

Those of ordinary skill in the art will appreciate that an alternate architectural embodiment may make use of a standalone battery powered unit in which user interface 23 is contained via on-tool display controls and which computes azimuth 52, elevation 50 and roll values 54 and derives alignment error based on nominal mounting. Consequently, only minimal user skill would be required to install a new LRU onto the aircraft after the alignment error is known. As discussed further below with reference to a method of using the system, once the alignment error is known, it can be compensated for when installing the new LRU onto the aircraft (or other piece of equipment or device). For example, software in the LRU can be instructed to compensate for the alignment error. In some cases, the mounting bolts and/or a mounting bracket that mounts the new LRU onto the aircraft can be physically altered so that the alignment error is correct before the new LRU is mounted to the aircraft.

Those of ordinary skill in the art will also appreciate that still another alternate architectural embodiment would make sense of a standalone battery powered unit. The display can also contain on-tool user control data for X, Y, and Z rotations (not related to aircraft measurements) would be computed so that some user skill would be required to compute azimuth, elevation and roll, and to derive error as a post-processing activity.

ATLAS System Accuracy Testing

The System Accuracy Testing was conducted to establish the accuracy of ATLAS. Those of ordinary skilled in the art would appreciate that suitable software could be written by one of ordinary skill in the art and used in this example and test. ATLAS is a tool designed for use with a user handling the tool, so the system accuracy testing was designed to use actual human handling. The test utilizes the ATLAS acceptance test procedure (ATP) fixture to take measurements of known positions. The test was performed as follows:

- 15 ATPs on a lab bench—minimal handling and time between measurements.
- 15 ATPs walking 30 feet between ECU tray and LRU measurement, which induced about 50% of gross motion and used about half of the three minute measurement time. Reaching the desired time between measurements was done by allowing the handheld IMU to sit on the ATP fixture after the 30 ft of walking took place until 1:30 was reached.
- 15 ATPs walking 60 feet between ECU tray and LRU measurement, which induced the maximum amount of gross motion and time between measurements. Again, the walking was executed to leave about 10% gross motion on the meter and then the handheld IMU was sitting on the ATP fixture until about 0:10 were left of the measurement time.
- 3 ATPs at +50 C—this doubles as the thermal test
- 3 ATPs at −17° C.—this doubles as the thermal test This test plan was a representative system accuracy test of how ATLAS will be used in the field.

Results

The ATP uses a precision machined fixture with six locations to be measured by ATLAS. The inspection report of the plate provides evidence that this plate was machined to an accuracy in which all discernible errors measured with ATLAS are assumed to be caused by the ATLAS tool itself.

Figure 2:
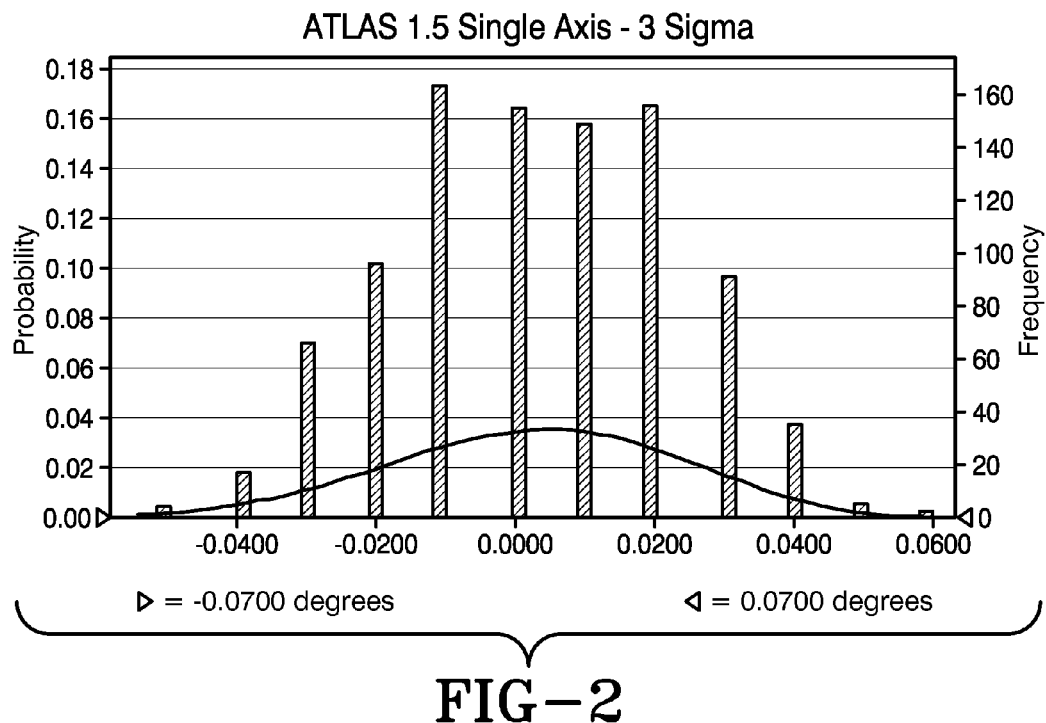
FIG. 2 is a graph showing single axis 3 sigma accuracy.

ATP data is displayed as Azimuth, Elevation, and Roll deviation from nominal mounting for each LRU. The data was first viewed in single angle where data from all three axes and all LRUs was compiled into one data set and statistical analysis was performed using a statistical software tool. The single axis three sigma (value that 99.73% of the data is below) data analysis is shown in FIG. 2.

Figure 3:
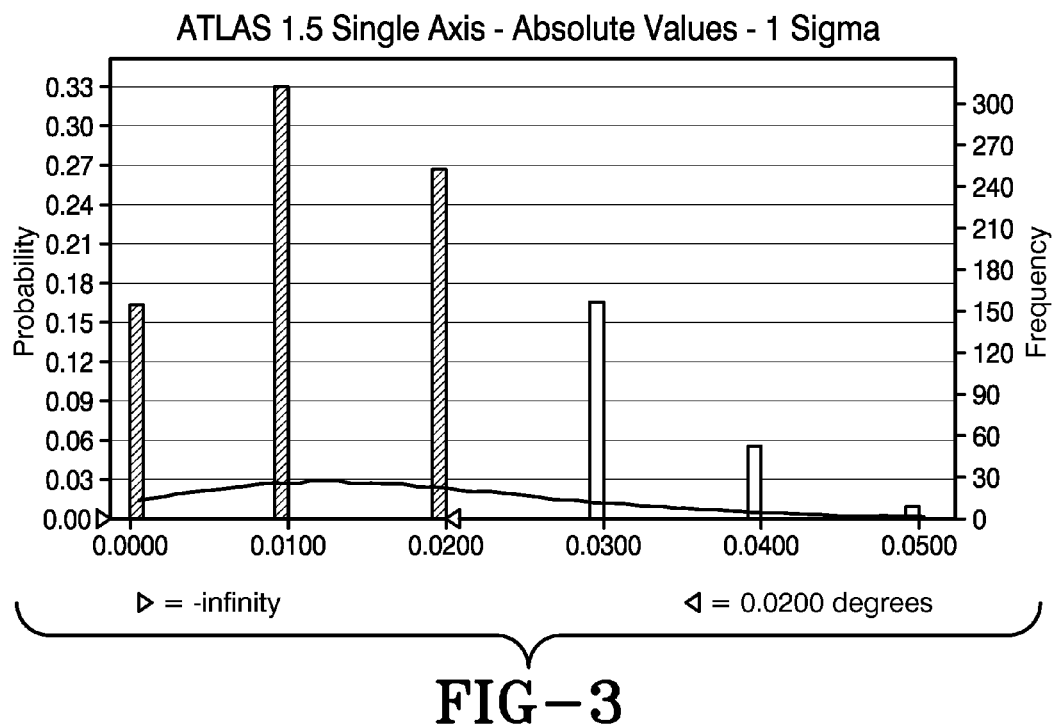
FIG. 3 is a graph showing single axis 1 sigma accuracy.

Single Axis Accuracy is what can be expected on each axis on a given measurement. The three sigma single axis accuracy of ATLAS is 0.0700 degrees, while the one sigma (value that 69% of the data is below) single angle accuracy is 0.020 degrees as shown in FIG. 3. To determine the accuracy associated with a multi axis rotation as it applies to a single measurement comprised of all three axes, Equation 1 was used. Equation 1:

$$\phi = \cos^{-1}[\cos(\Delta\theta_{pitch}) \cdot \cos(\Delta\theta_{Yaw}) + (\cos(\Delta\theta_{Roll}) \cdot \cos(\Delta\theta_{Yaw}) - \sin(\Delta\theta_{Roll}) \cdot \sin(\Delta\theta_{Pitch}) \cdot \sin(\Delta\theta_{Yaw})) + \cos(\Delta\theta_{Roll}) \cdot \cos(\Delta\theta_{Pitch}) - 1/2]$$

Figure 4:
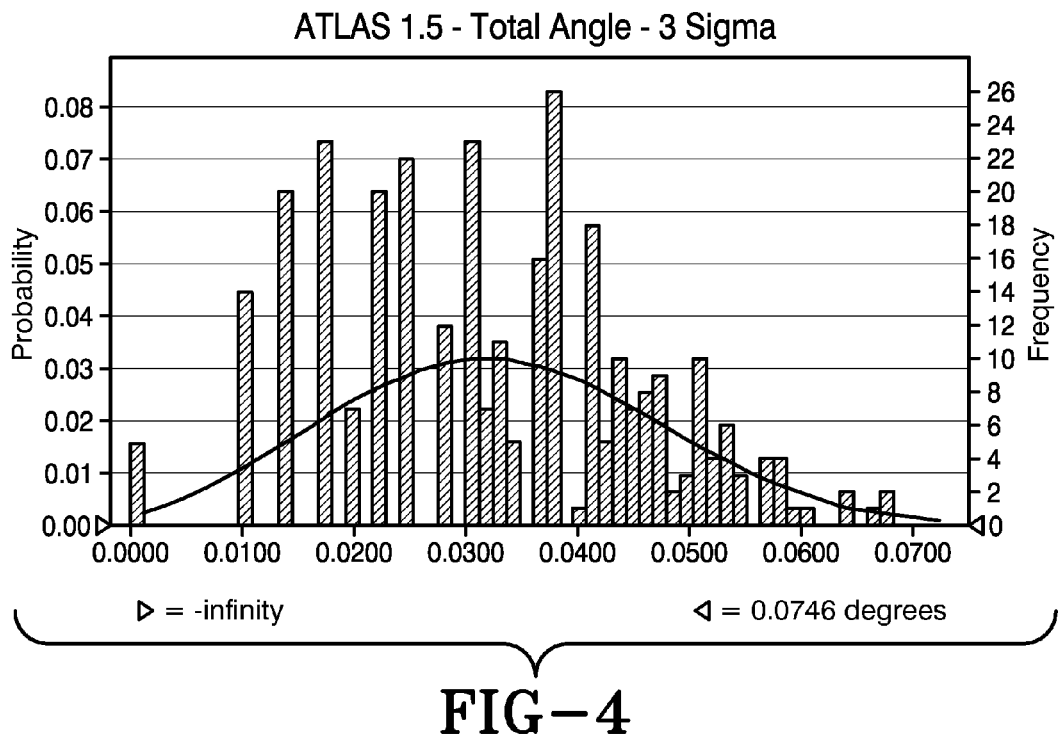
FIG. 4 is a graph showing total angle 3 sigma accuracy.
Figure 5:
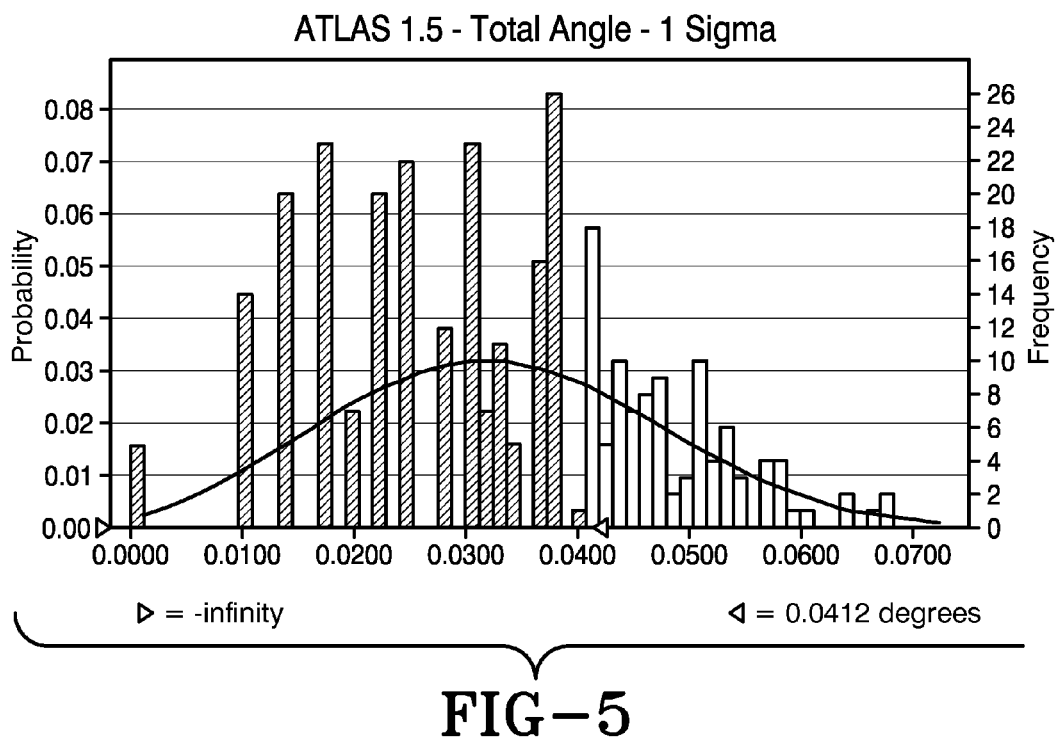
FIG. 5 is a graph showing total angle 1 sigma accuracy.
Figure 6:
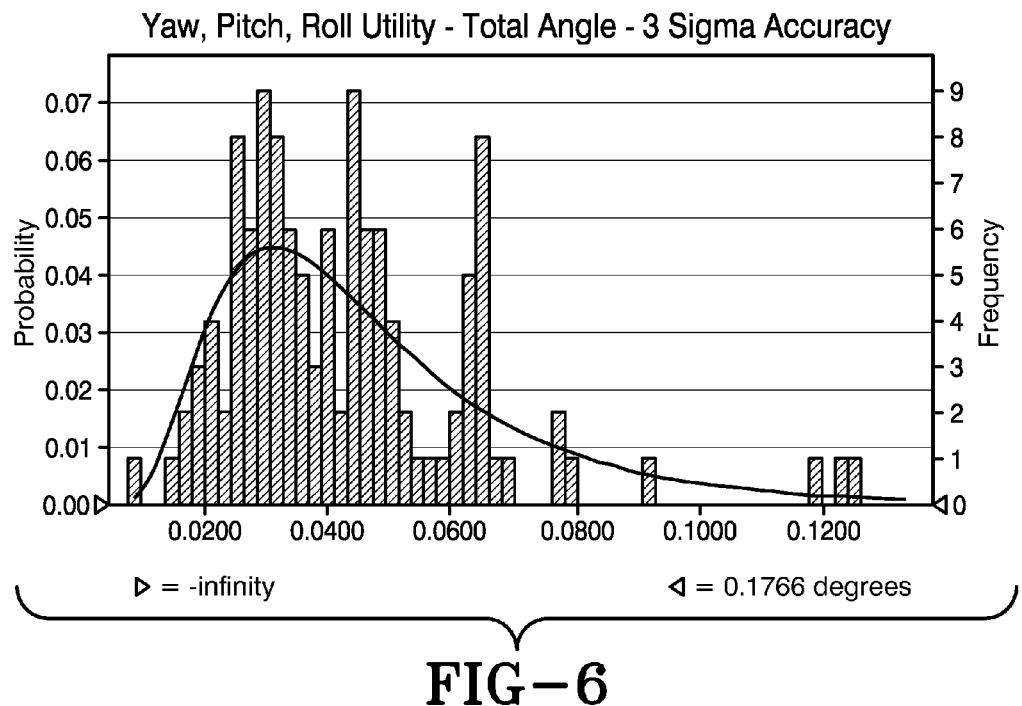
FIG. 6 is a graph showing yaw, pitch and roll utility total angle 3 sigma accuracy.
Figure 7:
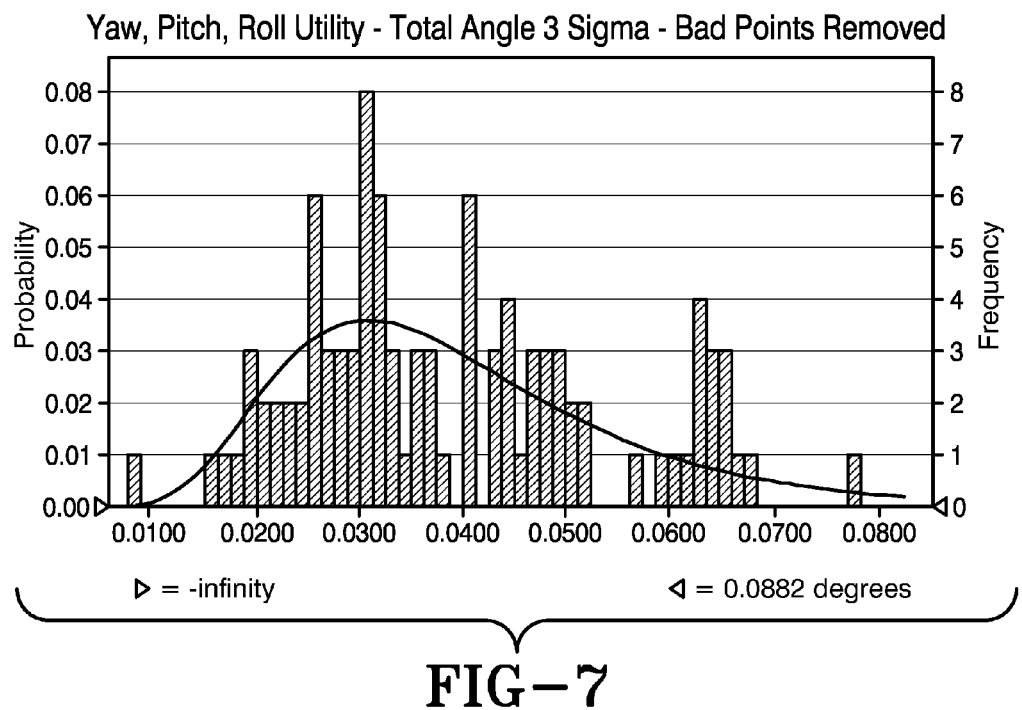
FIG. 7 is a graph showing yaw, pitch and roll utility total angle 3 sigma accuracy with the bad data points removed.

A total angle value was calculated for each Azimuth, Elevation, and Roll data set (one total angle for each LRU measurement in each ATP) as shown in FIG. 4. The three sigma total angle accuracy of ATLAS is 0.0746 degrees, as shown in FIG. 4, while the total angle one sigma accuracy is 0.0412, as shown in FIG. 5.

System Accuracy Conclusion

The results documented above show the accuracies for ATLAS were as follows:
- Single Axis, $1\sigma = 0.0200$ degrees
- Single Axis, $3\sigma = 0.0700$ degrees
- Total Angle, $1\sigma = 0.0412$ degrees
- Total Angle, $3\sigma = 0.0746$ degrees Based on the values above, the worst case accuracy for ATLAS is 0.0746 degrees, which is a 30% accuracy improvement from the ATLAS three sigma total angle accuracy of 0.1070 degrees. Thus, the algorithm improvements made during the ATLAS effort were successful in increasing accuracy. It is important to note that all Accuracy Testing during this round of testing was done at room temperature. The data gathered in the testing showed that ATLAS can operate over the −17 C to 50 C range with no appreciable difference to the accuracy of the data. Therefore, this accuracy is expected over the entire operating temperature range.

LRU Face Fixture

The LRU Face Fixtures were designed to allow ATLAS to measure the alignment of an LRU without removing the LRU from the mounting provisions. The two Face Fixture designs mimic the standard ATLAS LRU fixtures in which the raised surfaces are opposite from each other based on the clocking of the LRU. By design, both Face Fixtures provide mechanical surfaces to interface with the IMU handheld and interface with an installed LRU on a platform requiring only two of the four mounting bolts to be removed. The interface with an installed LRU was tested through the use of a mounted LRU with two mounting screws removed. The IMU handheld was mounted to each face fixture and the interface with the test fixture was completed.

The interface with the LRU was successful and verified requirements. A full tolerance analysis was conducted to determine the maximum error ATLAS measurements will incur when using a face fixture.

Tolerance Analysis

The requirement for the LRU Face Fixture Accuracy states that the LRU Face Fixtures shall not add more than 0.4 degrees of accuracy error to the system when compared to the standard ATLAS LRU fixtures. To determine the error that is incurred by ATLAS when using the face fixture, a tolerance analysis was done on the standard LRU fixtures as well as the LRU Face Fixture.

Standard ATLAS LRU Fixture

The theoretical worst case tolerance stack up for roll error using the drawings for either of the standard ATLAS LRU Fixtures is shown below in Table 1. Please note the Az/El error was determined by the flatness callouts on the drawing and do not require a summation as with the Roll Error.

TABLE 1

Standard LRU Fixture Worst Case Error

| Interface | Worst Case Error (degrees) |
|---|---|
| IMU Handheld to LRU Fixture | 0.038 |
| LRU Fixture | 0.098 |
| LRU Fixture to Aircraft Bolts | 0.047 |
| Aircraft Bolts Runout | 0.036 |
| Total Roll Error | 0.219 degrees |
| Total Az/El Error | 0.024 degrees |

To calculate the total angle error associated with the azimuth, elevation, and roll angle above the calculations shown below were completed. To Break the Az/El Value into separate Az/El values the following equations are used:

$$Az/El = \sqrt{Az^2 + El^2}$$

$$0.024 = \sqrt{Az^2 + El^2}$$

$$0.024 = \sqrt{1^2 + 1^2}$$

$$Az = El = 0.024/\sqrt{2}$$

$$Az = El = 0.017$$

With Az=0.017 degrees, El=0.017 degrees and Roll=0.219 degrees The total angle was calculated using:

$$\phi = \cos^{-1}\left[\frac{\cos(\Delta\theta_{Pitch})\cdot\cos(\Delta\theta_{Yaw}) + (\cos(\Delta\theta_{Roll})\cdot\cos(\Delta\theta_{Yaw}) - \sin(\Delta\theta_{Roll})\cdot\sin(\Delta\theta_{Pitch})\cdot\sin(\Delta\theta_{Yaw})) + \cos(\Delta\theta_{Roll})\cdot\cos(\Delta\theta_{Pitch}) - 1}{2}\right]$$

and was found to be a total angle of 0.22 degrees

LRU Face Fixture

Similar to the Standard LRU fixture analysis, a second analysis was conducted for the LRU face fixture as shown in Table 2.

TABLE 2

LRU Face Fixture Worst Case Error

| Interface | Worst Case Error (degrees) |
| --- | --- |
| LRU Face Fixture | 0.060 |
| Face Fixture Pins to LRU Holes | 0.036 |
| LRU | 0.000 |
| LRU to Aircraft Bolts | 0.193 |
| Aircraft Bolts Runout | 0.036 |
| Total Roll Error | 0.325 degrees |
| Total Az/El Error | 0.072 degrees |

To calculate the total angle error associated with the azimuth, elevation, and roll angle above the calculations shown below were completed. First the Az/El values were broken into separate Az/El values:

$$Az/El = \sqrt{Az^2 + El^2}$$
$$0.072 = \sqrt{Az^2 + El^2}$$
$$0.072 = \sqrt{1^2 + 1^2}$$
$$Az = El = 0.072/\sqrt{2}$$
$$Az = El = 0.051$$

With Az=0.051 degrees, El=0.051 degrees and Roll=0.325 degrees the total angle is again calculated:

$$\phi = \cos^{-1}\left[\frac{\cos(\Delta\theta_{Pitch})\cdot\cos(\Delta\theta_{Yaw}) + (\cos(\Delta\theta_{Roll})\cdot\cos(\Delta\theta_{Yaw}) - \sin(\Delta\theta_{Roll})\cdot\sin(\Delta\theta_{Pitch})\cdot\sin(\Delta\theta_{Yaw})) + \cos(\Delta\theta_{Roll})\cdot\cos(\Delta\theta_{Pitch}) - 1}{2}\right]$$

The total angle=0.33 degrees.

Based on the tolerance analysis of both the standard LRU fixture and the LRU face fixture the face fixture adds 0.11 degrees of total angle error to the ATLAS System. This value is much less than the 0.4 degree requirement and therefore the face fixtures meet this requirement.

Test Summary

Accuracy results show ATLAS as having the accuracies below, with almost a 30% improvement for 3 sigma total angle accuracy from the 1.4 Software.

Single Axis, 1σ=0.0200 degrees
Single Axis, 3σ=0.0700 degrees
Total Angle, 1σ=0.0412 degrees
Total Angle, 3σ=0.0746 degrees In summary, ATLAS is adapted for use by an end user who requires minimal knowledge of the alignment process. It features embedded processes that provide an easy-to-follow and standardized measurement approach, and also eliminates the need for the user to know any of the mathematics involved in alignment angle determination; the user simply follows a few easy steps laid out on ATLAS's graphical user interface (GUI), which is configured to graphically display the positional error value on the GUI. This solution allows for dependable, precise alignment data to be obtained while drastically minimizing the time, effort and variability of measurement.

Those of ordinary skill in the art will appreciate that while ATLAS was designed around a specific program need, in order to broaden the capabilities of the tool, the invention incorporates generic Euler Angle measurements. With this added capability, ATLAS is no longer tied to the measurement of specific equipment. ATLAS could be used to determine the amount of angular displacement between an initial reference point and a device under test. As understood by those with ordinary skill in the art, ATLAS could be used in many different environments where alignment is important. For example, ATLAS could be used to determine an angular displacement of an installed fairing relative to a platform reference. Alternatively, ATLAS could be used in involving operations manufacturing equipment workcell alignment. ATLAS might also be used in weapon boresight alignment or the alignment of sensor arrays.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 8:
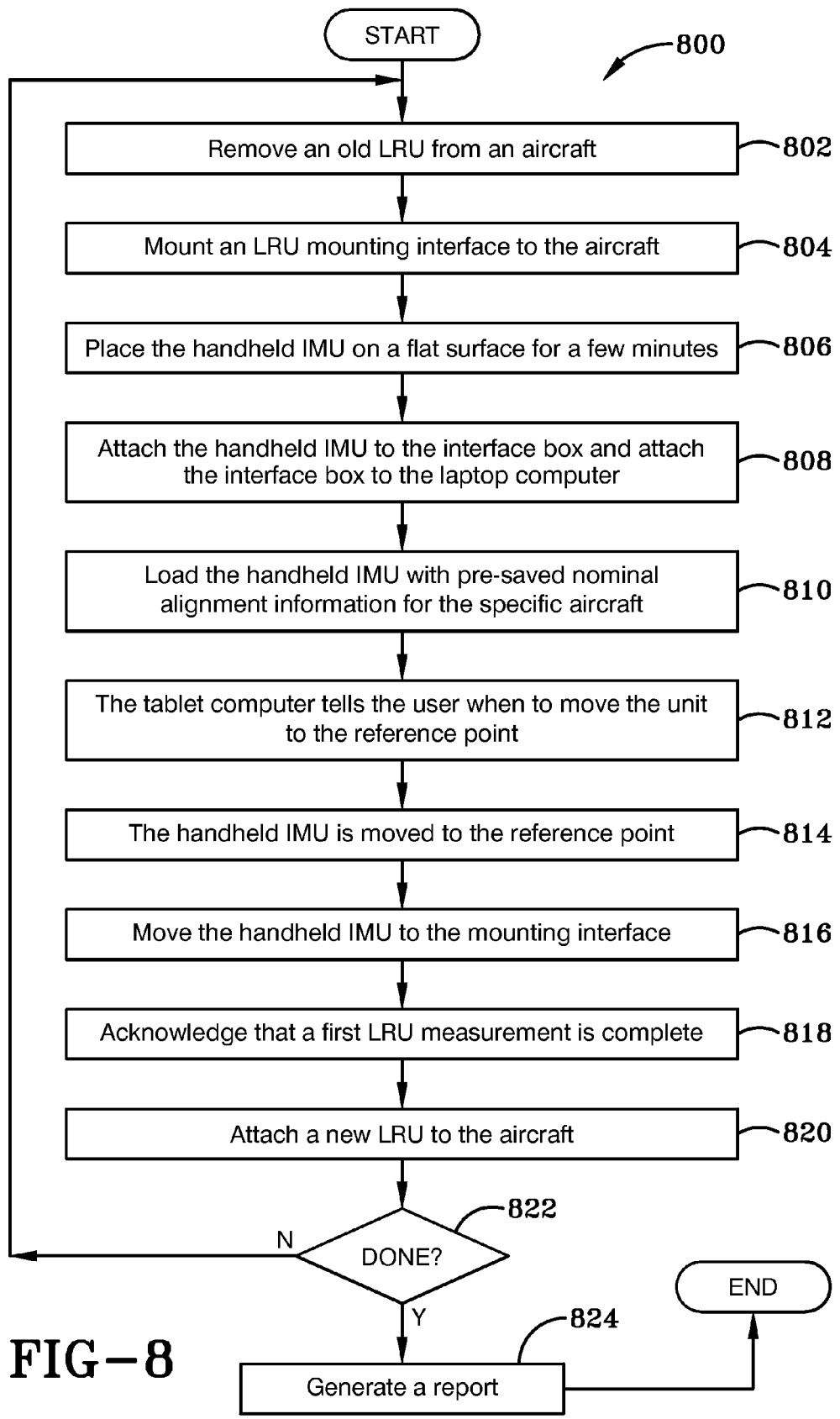
FIG. 8 is a flow chart of a sample method for attaching an item onto a piece of equipment.

FIG. 8 illustrates a method 800 of using system 1 of FIG. 1A for attaching a device onto a piece of equipment such as an aircraft 14. The method 800 begins by removing an old device or LRU 900 from aircraft 14 or other piece of equipment, at 802, and as illustrated in FIG. 9A. In more detail, the old LRU would have been mounted to an LRU mount that is part of the aircraft. After the old LRU 900 is removed, an LRU mounting interface 13 is attached to the aircraft 14, at 804. The mounting interface 13 can be mounted to the aircraft 14 using some of the same bolt holes used to mount the old LRU 900 to the LRU mount on the aircraft 14.

The mounting interface 13 provides a way of easily positioning handheld IMU 3 in the proper orientation with aircraft 14 when IMU 3 is to take positioning measurements of the aircraft's mount for the new LRU associated with that location on aircraft 14. Also, aircraft 14 has different shapes at different location for different LRUs, so different mounting brackets are needed for differently shaped locations. The mounting brackets are relatively inexpensive so they provide a way of allowing one handheld IMU 3 to be used at many different locations.

Figure 9E:
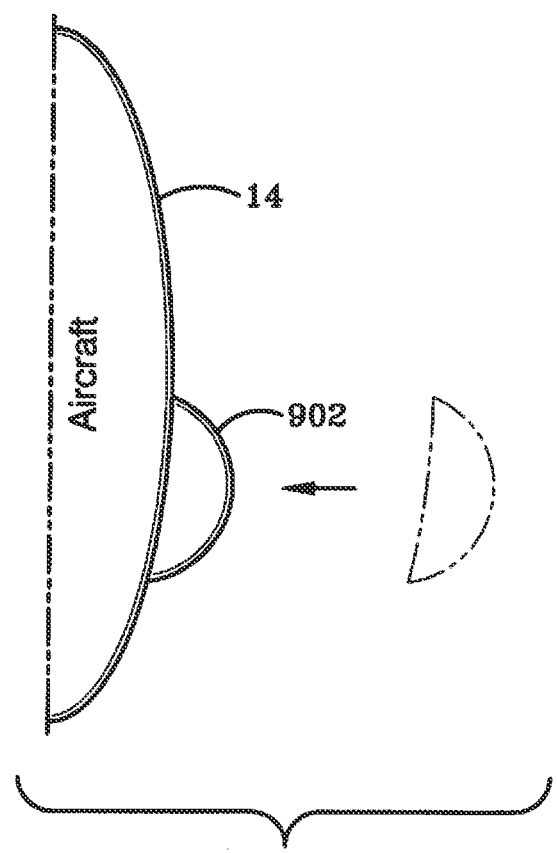

As illustrated in FIG. 9B, handheld IMU 3 is placed on a flat horizontal surface 56 for a few minutes, at 806, so that it can calibrate itself with respect to a horizontal position. In one embodiment, IMU 3 can determine its initial elevation angle 50, azimuth angle 52 and roll angle 54 about roll axis 55 in this position. As illustrated in FIG. 9C, handheld IMU 3 is attached to interface box 5, at 808, and interface box 5 is attached to the tablet computer 7. Next, the handheld IMU is loaded, at 810, with pre-saved nominal alignment information for the specific aircraft/piece of equipment. The tablet computer 7 tells the user when to move the unit to the reference point, at 812. Handheld IMU 3 is moved, at 814, to a reference point wherein it can be further oriented with respect to aircraft 14. Handheld IMU 3 is then moved, at 816, to LRU mounting interface 13 as shown in FIG. 9D. While properly positioned at the mounting interface, handheld IMU 3 determines position data that indicates how the mounting interface is positioned with respect to the piece of equipment. In particular, IMU 3 measures the elevation angle 50, azimuth angle 52 and roll angle 54 of the LRU mounting interface. The user acknowledges that the first LRU measurement is complete, at 818. For example, a "completed measurement button" on handheld IMU 3 can be pressed to indicate a measurement has been completed or that handheld IMU 3 has determined the position data. After handheld IMU 3 and mounting interface 13 are removed from aircraft 14, a new LRU 902 can be attached to the aircraft, at 820. More particularly, the new LRU 902 can be mounted to the LRU mount 13 on aircraft 14, as illustrated in FIG. 9E.

A decision is made, at 822, to determine if more measurements are to be made. If so, flow returns to block 802 to remove a second old LRU. Alternatively, flow returns to block 804 when a new second LRU is to be mounted to aircraft 14 without removing an old LRU. A report is generated, at 822. The report can show the nominal mounting orientations, actual measured mountings, the position data, derived errors and/or other information. As mentioned above, this report may indicate there is too much position error, and then software in the new LRU 902 can compensate for that error when the new LRU 902 is in operation.

The computer logic is configured to determine or calculate a position error value based on the position data, wherein the position error value indicates if a new device can be installed without correcting for a position of the device mount, and thus compensation for the position error value can be made if the new device cannot be installed without correcting for a position of the device mount. It may also be said that the computer logic is configured to calculate, based on the position data, a positional error value that can be used to indicate to a user whether corrections need to be made regarding how the new LRU is mounted to the LRU mount before the new LRU is mounted to the LRU mount or whether the new LRU can be mounted to the LRU mount without any corrections. The computer logic may be configured to generate the report after the handheld IMU has determined position data for two or more different locations.

Alternatively, a technician may have to physically alter mounting bolt locations and/or modify other physical mounting structures on the aircraft/piece of equipment to correct errors in mounting orientation before the new LRU is mounted to the equipment/aircraft 14. Alternatively, computer 7 can also generate such reports after each press of the "measurement complete button" discussed above so that each new LRU can be installed immediately after completing a measurement at each respective location.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in the preferred embodiment" does not necessarily refer to the same embodiment, though it may.

The invention claimed is:

1. A system for mounting a new line replaceable unit (LRU) to a piece of equipment, the system comprising:
   a handheld inertial measurement unit (IMU) that can be manipulated by a single person wherein the piece of equipment has a first old LRU mount attached thereto and configured to allow a new LRU to be mounted to the piece of equipment at the first old LRU mount;
   a computer logic in communication with the handheld IMU;
   a mounting interface configured to be removably mounted to the first old LRU mount attached to the piece of equipment, wherein the handheld IMU is movable toward and away from the mounting interface while the mounting interface is mounted on the first old LRU mount so that the handheld IMU may be positioned adjacent the mounting interface to allow the handheld IMU to determine position data with respect to the first old LRU mount and the piece of equipment while the handheld IMU is positioned adjacent the mounting interface;
   wherein the computer logic is configured to calculate, based on the position data, a positional error value that can be used to indicate to a user (a) whether corrections need to be made regarding how the new LRU is mounted to the LRU mount before the new LRU is mounted to the LRU mount or (b) whether the new LRU can be mounted to the LRU mount without any corrections.

2. The system of claim 1 further comprising:
   an interface box, wherein the computer logic is in communication with the handheld IMU through the interface box, and wherein the interface box is configured to provide power management to the handheld IMU and to control inputs of the handheld IMU.

3. The system of claim 2 wherein the interface box further comprises:
   an RS-232 interface for communicating with the computer logic; and
   an RS-422 interface for communicating with the handheld IMU.

4. The system of claim 2 wherein the interface box further comprises:
   a power supply device configured to provide at least one of the group of: a direct current (DC) voltage to the handheld IMU and an alternating current to the handheld IMU.

5. The system of claim 1 wherein the handheld IMU further comprises:
   a button configured to be pressed by a user to indicate that the handheld IMU has determined the position data.

6. The system of claim 1 wherein the handheld IMU further comprises:

a light emitting diode (LED), wherein the handheld IMU is configured to turn on the LED when the handheld IMU has determined the position data.

7. The system of claim 1 wherein the position data comprises rotational rate values.

8. The system of claim 1 wherein the computer logic further comprises a graphical user interface (GUI) configured to graphically display the positional error value on the GUI.

9. The system of claim 1 wherein the system is configured to measure with an accuracy of 0.1 degrees total angle, three sigma deviation over 3 minutes.

10. The system of claim 1 wherein the computer logic is further configured to generate a report with one or more of the group of: nominal mounting information, measured mounting parameters and error values.

11. The system of claim 10 wherein the computer logic is further configured to generate the report after the handheld IMU has determined position data for two or more different locations.

12. The system of claim 10 wherein the handheld IMU is configured to measure at least one of the group of an azimuth angle, an elevation angle, a Euler angle and a roll angle.

13. The system of claim 1 further comprising
a first mounting bracket which removably mounts the mounting interface at the first old LRU mount; and
a second mounting bracket which is different from the first mounting bracket and which removably mounts the mounting interface at a second old LRU mount attached to the piece of equipment.

14. The system of claim 13 wherein the piece of equipment has a shape at the first old LRU mount and a shape at the second old LRU mount which is different than the shape at the first old LRU mount.

15. The system of claim 1 wherein bolt holes used to mount an old LRU to the first old LRU mount are used to mount the mounting interface to the piece of equipment.

\* \* \* \* \*